UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

PLASTIC SHOE-BOTTOM FILLER AND PROCESS OF MAKING THE SAME.

1,121,688.  Specification of Letters Patent.  Patented Dec. 22, 1914.

No Drawing.  Application filed June 21, 1912.  Serial No. 705,135.

*To all whom it may concern:*

Be it known that I, ANDREW THOMA, a citizen of the United States, and resident of Cambridge, in the county of Middlesex and State of Massachusetts, have invented an Improvement in Plastic Shoe-Bottom Fillers and Processes of Making the Same, of which the following description is a specification.

My present invention relates to the manufacture and composition of a shoe filler of that special character which has, as set forth in my copending application Serial No. 432,083, filed May 11, 1908, (which has since become Patent No. 1,032,312, dated July 9, 1912) a stiff-setting component so as to control the sticky character of the other component. I have found that the fluxing or dissolving of the resinous gummy or tarry sticky component by means of heat or by naphtha or oil solvents, renders the solution very penetrating, so that whenever ground leather or like fibrous material is used as the filler-body, the cementing fluid penetrates such material and destroys its resiliency to a large extent. This makes necessary, also, a much larger quantity of the sticky component than would otherwise be needed to unite the given bulk of shoe-filler body-material. To obviate this, I have discovered the following—and to make my discovery more clearly and directly understood, I will give a concrete example before explaining the invention broadly in its more comprehensive scope. If, for example, I add a considerable portion of some dry absorbent powder, for instance plaster of Paris, to soft, low-melting wax-tailings while the latter is in a condition fluid by heat, the tailings are readily absorbed and taken up by the powder, *i. e.* the grains of powder become permeated and coated so that the fluidity and hence penetration are largely neutralized, and the mass, if I have added the right proportions, becomes, when cold, like a sticky soft putty in consistency. When then a sufficient amount of water, preferably hot, is added, (the dissemination of the water-repellent tailings among the powder rendering the mass readily amenable to the action of water) this putty-like mass assumes the consistency of a fluid paste, to which I add a large proportion of ground leather or like fibrous body-giving material or ground cork or other well known granular shoe-filler substances until the whole mixture assumes the stiffness of a dough. Because of the fact that the powder is impregnated with the tailings or the tailings are loaded with the powder and the whole reduced to a paste-like condition, the immersion and admixing of the shoe-filler body-material into this paste practically eliminates the tendency of the ground leather or other comminuted body-material to absorb the otherwise-penetrating sticky ingredient. The ground leather absorbs much less of the wax tailings,—the powder seeming to hold to it in great part so that the leather particles are coated or enveloped, as it were, each with a film composed of the powder and the tailings (or other binding body) in such a pasty condition that the penetrating ingredient cannot penetrate, but the film adheres nevertheless closely to the granules of body-material without penetrating into the shreds or particles thereof, leaving the body-material (which is preferably fibrous, ragged leather particles) in practically its natural condition. The body-material is simply matted together but not materially changed, so that it retains all its native strength and resiliency instead of being rendered soggy and dull or inert by the absorption of the binder. Preferably it is expedient to use in place of a portion of the plaster of Paris, other still more readily absorbent powders or porous powders, such as infusorial earth, china clay, whiting, fullers' earth, magnesia, lime, asbestos, pulverized slate, talc, soapstone, the oxids or carbonates of various metals, the elimination of a portion of the plaster of Paris reducing the stiffening effect of the compound as may be desired. In fact, all the plaster of Paris may be omitted and the other powders wholly employed, in which case, however, either a different stiff-setting component must be employed or a different character of the sticky component used which shall provide the required stiffness and permanent stability of the filler-layer. By using the plaster of Paris or other absorbent inert powder, I am enabled to use a much softer and more sticky variety of the wax tailings (or any of the other sticky elements in the various lists contained in my application aforesaid and the other applications and patents therein referred to). One advantage of using a more sticky and softer component for the sticky element of the compound is that it is less expensive. Without the inert powder of my present invention, such soft and sticky component could not be used because of its very low-melting and high penetrating character (especially with a porous body-material like leather). Instead of the plaster of Paris, any other suitable inert powder capable of absorbing the sticky element and at the same time acting as a stiff-setting component may be employed, such for instance as cement (either Portland, natural, or slag). The use of various powders which are not inert is mentioned and claimed in my application before noted, the present application being limited, so far as this feature is concerned, to the inert powders (but not to the exclusion of the soluble powders, which may be used as stiffening agents along with these inert powders, within the scope of the present invention and my appended claims). The resulting filler may be used without heat, or preferably with heat; at least it is preferable to use heat in connection with the spreading of it, as for instance with a heated tool, in order to render the flowing thereof more smooth and pliable. The heated tool brings out the stickiness and waterproofing characteristics which have been latent or smothered temporarily by the powder and moisture. The filler is adhesive and cohesive, and, as the resilient or yielding character of the comminuted filler body-material has not been appreciably affected, the filler is highly efficient in the shoe bottom. The absorbent substances mentioned are all of mineral origin, and, generally speaking, mineral substances are to be preferred because they are cheap, indestructible, easily powdered, and non-inflammable, but other substances may be used. These substances form in effect part of the filler-body but preferably much finer than the normal granular body-material. Among the other substances, I may mention powdered hardwood dust or similar dust-like waste materials of vegetable origin, or bone-dust, or dried blood. In fact, any powdery or absorbent diluent or subdivider and disseminator of the adhesive agent of my composition may be used to act to some extent as the restrainer of the adhesive or as a combined co-adhesive and restrainer. For lack of a different generic designation, I use in the claims the word "restrainer" as the generic name for all of the powders mentioned. The word restrainer has the same meaning as in my copending application first mentioned.

The sticky component of my composition may be any of the various gummy, tarry and pitchy substances or other sticky substances and compositions referred to in my application identified above. Instead of the word "gummy", as used in commerce, the word "waxy" is equally well known in special trades to refer to the same characteristic and materials, and accordingly I use the word "waxy" to include the word "gummy" as thus used, and it means here the sticky pitchy materials subservient to melting heat and not soluble in water. For instance, wax-tailings is waxy or gummy in the same sense. For instance, the plaster of Paris itself is a binder and, if properly retarded so that it will not set with undue quickness, it may be mixed directly with the shoe-filler body-material, such as ground cork or ground leather, to constitute filler,—and in such case still better results can be obtained by using a retarder which is also an adhesive and a toughener (so as to modify the otherwise brittle character of the plaster), as for instance dextrin or the glues of my before mentioned application permanently jellified and rendered permanently pliable as therein explained.

For a purpose given below, I prefer sometimes to use cements having hydraulic setting qualities, such as Portland cement or plaster of Paris, or cements having similar setting properties, such as magnesium oxychlorid cement, as diluents of my adhesive. Also these all have a restraining effect upon the sticky nature of the adhesive and are included among the restrainers. In using cements of the nature just indicated, water must of course be supplied. I mix with the powdered cement, the suitable amount of the sticky component so that I get as a result, a mass of the consistency of very soft putty. I then add enough water to bring the mass to a free-flowing, thoroughly liquid condition. To this I add my filler body-material, generally ground leather, although cork or pulp may be used,—before the cement begins to set, and stir and work enough in to make a mass of the consistency of dough. Part of the water is used in hydrating the cement. Under the treatment indicated, the cement cannot set in mass, but I believe that each tiny quantity mixed with the waxy film around each particle of filler body-material, receives its proper quantity of water, hardens, and forms a more or less stiff envelop about the same particle. Part of the water acts as a menstruum probably and is subsequently removed by evaporation. Plaster of Paris under ordinary conditions is quite quick-setting when moistened. The presence of the wax tailings retards this to some extent, and if it is desired to retard it still further I add a small proportion (say half of one per cent.) of marshmallow or lime, or other of the well known retarders used for this purpose. The presence of the plaster of Paris increases the cohesiveness of the filler mass but not its adhesiveness, and hence, as already mentioned, it is preferable to supply the additional adhesiveness by a sticky paste, as mentioned in my application aforesaid, in which case one function of the plaster is to make the filler quicker-setting. While I have mentioned the fact that the presence of the powder largely eliminates the loss of the sticky component previously due to absorption by the shoe-filler body-material, it is to be borne in mind that the powder increases the bulk or ultimate mass of the filler, and of course there must be used enough of the sticky component to convert the entire mass into proper condition of cohesion, pliability, permanency, etc., to constitute a shoe-filler. This water treatment of the saturated plaster makes it possible to cut down to a large extent the quantity of the sticky component used for the total bulk of filler, because much less of it is held absorbed by the cement, the water replacing or driving it out to a large extent.
The filler-body portion of the compound being more or less porous, also takes up the water in preference to the slower moving tailings, and the water thus absorbed prevents the entry of the tailings into the particles of the filler-body. The water bars it out. I include ground cork among the water-absorbent materials, as I do not intend by the latter term to require the absorption of water to any great extent but only enough to repel the tailings (or other penetrative adhesive).

I may compound the filler indicated above without adding water until all the other ingredients have been mixed. The material so compounded without water may be shipped in suitable packages or containers, and the shoe manufacturer may himself add the water and stir it in. I may also ship in suitable packages or containers the composition without either water or fibrous or other shoe-filler body-material, leaving the user to add both water and body material, i. e. the leather scrap, ground, of his shop, or any other shoe-filler body-material he pleases.
In case I should use magnesium cement (which is not the preferred form), which is formed by bringing together magnesium oxid and magnesium chlorid, I may mix my material, i. e. the sticky component, and the earthy absorbent with or without the fibrous filler-body, with magnesium oxid and ship it so, letting the user add the necessary chlorid diluted with a proper amount of water and the filler-body if necessary. I may also mix in the magnesium chlorid with the other constituents, dry, letting the manufacturer add the necessary water.

I have recited no particular formula, as it is evident that the invention does not depend or reside in the least upon proportions.

Having described my invention, what I claim as new and desire to secure by Letters Patent is:

1. The process of making shoe-bottom filler, which consists in mixing with a sticky water-repellent binder, a finely divided material capable of taking up the sticky binder so as to subdivide the binder and hold it in a separated condition amenable to the action of water, and then intermixing shoe-filler body-material to a dough-like consistency, substantially as and for the purpose described.

2. The process of making shoe-bottom filler, which consists in mixing with powdered cementitious material, wax tailings, adding water in excess of the quantity sufficient to set the cement and to make the mass fluid, and mixing with the fluid thus prepared, before the cement begins to set, a quantity of water-absorbent body-material, substantially as and for the purpose described.

3. The process of making shoe-bottom filler, which consists in mixing with powdered cementitious material, wax tailings, adding water in excess of the quantity sufficient to set the cement and to make the mass fluid, introducing means for retarding the cement, and mixing with the fluid thus prepared, before the cement begins to set, a quantity of water-absorbent body-material, substantially as and for the purpose described.

4. The process of making shoe-bottom filler, which consists in mixing with powdered plaster of Paris, a waxy heat-sensitive sticky binder, adding water in quantity, so as to make the result thinly fluid, mixing thoroughly, and adding at once to the mass thus prepared, a quantity of water-absorbent filler body-material until the mass attains a dough-like consistency, substantially as and for the purpose described.

5. The process of making shoe-bottom filler, which consists in mixing with powdered plaster of Paris, a sticky penetrative binder, adding water in quantity, so as to make the result thinly fluid, mixing thoroughly, and adding at once to the mass thus prepared, a quantity of water-absorbent filler body-material until the mass attains a dough-like consistency, substantially as and for the purpose described.

6. The method of making shoe-bottom filler, which consists in mixing powdered cementitious material and a permanently sticky waxy material, with water in excess of the quantity necessary to set the cementitious material, and mixing immediately with this a quantity of elastic water-absorbent body-material, substantially as and for the purpose described.

7. The process of making shoe-filler, which consists in mixing with a powdered material having the quality of hydraulicity, a heat-sensitive sticky binder, adding water, and stirring, then adding a quantity of water-absorbent elastic body-material, and stirring well before the cement begins to set, substantially as and for the purpose described.

8. The process of making shoe-filler, which consists in mixing with a powdered material, a part, at least, of which has the quality of hydraulicity, a heat-sensitive sticky binder, adding water, and stirring, then adding a quantity of water-absorbent elastic body-material, and stirring well before the cement begins to set, substantially as and for the purpose described.

9. The process of making shoe-filler, which consists in mixing with cementitious material, waterproof material of a sticky waxy nature and water and a quantity of granular elastic water-absorbent body-material, substantially as and for the purpose described.

10. The process of making shoe-filler, which consists in adding to a dry, water-setting, cement-making powder, wax tailings in a quantity sufficient to make when mixed a mass of a soft putty-like consistency, mixing, saturating with water to a thin, free-flowing condition, and adding at once ground cork in quantity sufficient to make a mass of the consistency of dough, and mixing, substantially as and for the purpose described.

11. The process of making shoe-filler, which consists in adding to a dry powder of absorbing material containing at least in part a dry water-setting, cementitious material, wax tailings in a quantity sufficient to make when mixed a mass of a soft putty-like consistency, mixing, saturating with water to a thin, free-flowing condition, and adding at once granular body-material in quantity sufficient to make a mass of the consistency of dough, and mixing, substantially as and for the purpose described.

12. The process of making shoe-filler, which consists in adding to a dry powder of absorbing material containing dry cementitious material, wax tailings in a quantity sufficient to make when mixed a mass of a soft putty-like consistency, mixing, saturating with water to a thin, free-flowing condition, and adding at once comminuted body-material containing ground leather, in quantity sufficient to make a mass of the consistency of dough, and mixing, substantially as and for the purpose described.

13. The process of making a shoe-bottom filler, which consists in mixing with waxy sticky adhesive material, a powdery absorptive material, and water to a thin pasty fluid, and then mixing in a quantity of elastic, granular, shoe-filler body-material sufficient to make a dough-like mass and until each granule is thinly coated with said mixture and the mass is sluggishly plastic as required for a shoe-filler, substantially as and for the purpose described.

14. The process of making a shoe-bottom filler, which consists in adding to a water-repellent sticky binder, an inert powdery material capable of holding the sticky binder in subdivided suspension so as to allow water to make the mixture fluid, mixing thoroughly with water to a thin pasty fluid, and then mixing in a quantity of comminuted shoe-filler body-material sufficient to make a dough-like mass and until each particle of said body-material is thinly enveloped with said mixture and the mass is sluggishly plastic as required for a shoe-filler, substantially as and for the purpose described.

15. The process of making a material for use in filling the bottoms of shoes, which consists in making wax-tailings less penetrative to the body-material by first adding a mineral powder, and then adding to this mixture comminuted shoe-filler body-material in quantity sufficient to give the mass a dough-like consistency, substantially as and for the purpose described.

16. A shoe-bottom filler, comprising hydratable plaster of Paris, retarding means to retard the setting of the plaster of Paris, and comminuted shoe-filler body-material united to a condition permanently dough-like or plastic when cold, substantially as and for the purpose described.

17. A shoe-bottom filler, comprising hydratable powdered material as described, retarding means to retard the setting of said material, and comminuted shoe-filler body-material united to a condition permanently dough-like or plastic when cold, substantially as and for the purpose described.

18. A shoe-bottom filler, which comprises a permanently sticky, heat-sensitive adhesive material, a powdered, inert cementitious material holding said adhesive material in a subdivided suspension, and a fibrous shoe-filler body-material united to a condition permanently dough-like or plastic when cold, substantially as and for the purpose described.

19. A shoe-bottom filler, which comprises a suitable permanently sticky binder, a cement such as described having hydraulic properties, and a comminuted shoe-filler-body material, substantially as and for the purpose described.

20. A shoe-bottom filler, having a permanently pliable consistency, dough-like or plastic when cold so as to be moldable into a thin layer in the shoe-bottom, non-responsive to low heat under ordinary conditions of wear, and non-shiftable when set in the shoe-bottom, said filler containing a cementitious component for binding the mass, held in subdivided suspension throughout the mass by an inert powder, and the whole responsive to water to render the mass plastic for application to the shoe-bottom, substantially as and for the purpose described.

21. A shoe-bottom filler, having a permanently pliable consistency, dough-like or plastic when cold so as to be moldable into a thin layer in the shoe-bottom, non-responsive to low heat under ordinary conditions of wear, and non-shiftable when set in the shoe-bottom, said filler containing a normally low-heat responsive sticky binder normally water-repellent, held in a subdivided suspension by an inert disseminating powder rendering the mixture capable of being made fluid by water, substantially as and for the purpose described.

22. A shoe-bottom filler, having a permanently pliable consistency, dough-like or plastic when cold so as to be moldable into a thin layer in the shoe-bottom, non-responsive to low heat under ordinary conditions of wear, and non-shiftable when set in the shoe-bottom, said filler containing a normally low-heat responsive sticky binder normally water-repellent, held in a subdivided suspension by an inert absorbent disseminating powder rendering the mixture capable of being made fluid by water, substantially as and for the purpose described.

23. A shoe-bottom filler, having a permanently pliable consistency, dough-like or plastic when cold so as to be moldable into a thin layer in the shoe-bottom, non-responsive to low heat under ordinary conditions of wear, and non-shiftable when set in the shoe-bottom, said filler containing a normally low-heat responsive sticky binder normally water-repellent, held in a subdivided suspension by an inert absorbent and stiffening disseminating powder rendering the mixture capable of being made fluid by water, substantially as and for the purpose described.

24. A shoe-bottom filler, comprising a comminuted resilient shoe-filler body-material, intermixed to a plastic, sluggishly moldable consistency with a permanently sticky binder held in a finely subdivided condition by an inert powdered absorbent mineral, and capable of being rendered fluid by the addition of water, substantially as and for the purpose described.

25. A shoe-bottom filler, consisting of a moldable mass coherent, pliable and non-shifting when set, having a doughy consistency before setting, and containing a sticky binder rendered fluid by low heat, and an inert powdered absorbent material adapted to control the fluidity of the binder by its absorptive influence on the binder, substantially as and for the purpose described.

26. A shoe-filler for filling the bottoms of shoes, consisting of a moldable, coherent mass pliable and non-shifting when set, having a doughy consistency before setting, and comprising in its composition a comminuted fibrous shoe-filler body-material, a sticky binder rendered fluid by low heat, and an inert powdered absorbent material adapted to control the fluidity of the binder by its absorptive influence on the binder, substantially as and for the purpose described.

27. A shoe-filler for filling the bottoms of shoes, consisting of a moldable, coherent mass pliable and non-shifting when set, having a doughy consistency before setting, and comprising in its composition a comminuted fibrous shoe-filler body-material, a sticky binder rendered fluid by low heat, and an inert absorbent powder holding said binder in suspension and adapted to disseminate the binder in minute subdivision throughout the comminuted body-material by the aid of water, substantially as and for the purpose described.

28. A shoe-bottom filler, which comprises wax tailings, powdered plaster of Paris, and comminuted filler-body material, substantially as and for the purpose described.

29. In a shoe-filling compound, wax tailings diluted with dry plaster of Paris, substantially as and for the purpose described.

30. In a shoe-bottom filler, a penetrative sticky component, a water-absorbent component, and water sufficient to influence said water-absorbent component against becoming penetrated by said sticky component, said filler having a moldable plasticity, substantially as and for the purpose described.

31. In a shoe-bottom filler, a penetrative sticky component, a comminuted filler body-material, and a water-charged powdered component aiding in preventing said sticky component from penetrating said filler material, substantially as and for the purpose described.

In testimony whereof, I have signed my name to this specification in the presence of two subscribing witnesses.

ANDREW THOMA.

Witnesses:
JAMES R. HODDER,
EDWARD MAXWELL.